July 25, 1933. T. H. THOMAS 1,919,401
FLUID PRESSURE BRAKE
Original Filed Feb. 16, 1929
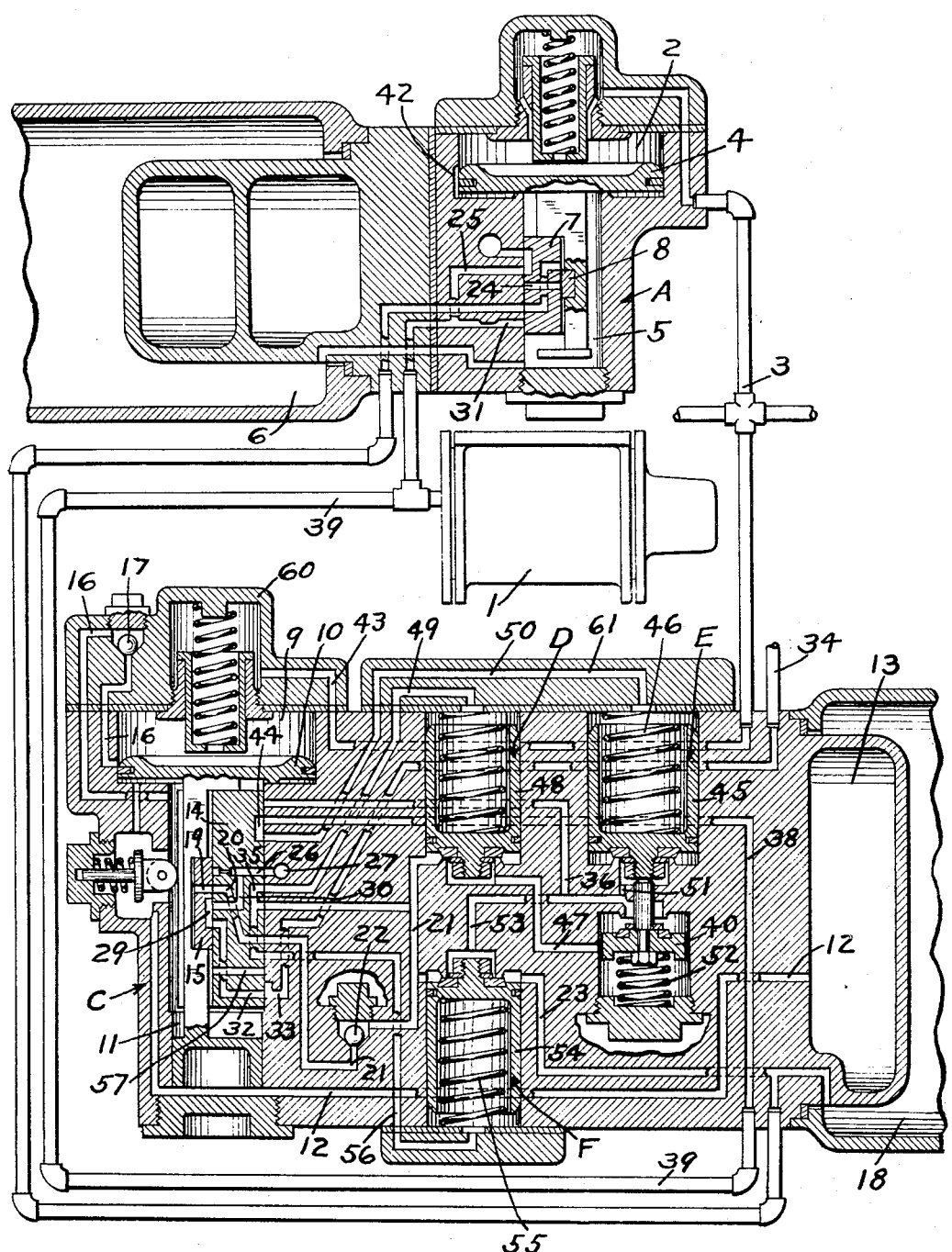
INVENTOR
THOMAS H. THOMAS
BY Wm N Cady
ATTORNEY Patented July 25, 1933

1,919,401

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed February 16, 1929, Serial No. 340,526. Renewed August 12, 1932.

This invention relates to fluid pressure brakes, and more particularly to a brake apparatus having means for effecting an emergency application of the brakes.

The principal object of my invention is to provide an improved emergency brake controlling device of the type disclosed in the pending application of W. E. Dean, Serial No. 280,684, filed May 26, 1928.

In the accompanying drawing, the single figure is a diagrammatic sectional view of a fluid pressure brake apparatus embodying my invention.

The apparatus shown in the drawing comprises a triple valve device A, an emergency valve device C, an initial inshot valve device D, a cut-off valve device E, and a final inshot valve device F.

The triple valve device A comprises a casing having a piston chamber 2 connected to the brake pipe 3 and containing a piston 4, and a valve chamber 5, connected to the auxiliary reservoir 6, and containing a main slide valve 7, and a graduating slide valve 8, adapted to be operated by piston 4.

The emergency valve device C comprises a casing having a piston chamber 9, connected to the brake pipe 3 and containing a piston 10, and a valve chamber 11, connected through passage 12 with a quick action chamber 13, and containing a main slide valve 14, and an auxiliary slide valve 15, adapted to be operated by piston 10.

When the brake pipe 3 is charged with fluid under pressure, fluid flows through the feed groove 42 around the piston 4 and charges the valve chamber 5 and the auxiliary reservoir 6. Fluid under pressure also flows from the brake pipe 3, through passage 43 to piston chamber 9 and through passage 16, past check valve 17, to valve chamber 11, and from valve chamber 11, through passage 12, to quick action chamber 13.

With piston 10 in normal release position, fluid also flows from valve chamber 11 to the emergency reservoir 18, through port 19 in auxiliary slide valve 15, port 20 in main slide valve 14, passage 21, and past check valve 22, to passage 23, which leads to the emergency reservoir.

When the brake pipe pressure is reduced at a gradual rate, to effect a service application of the brakes, the piston 4 is moved to service application position, in which fluid under pressure is supplied from the auxiliary reservoir 6 to the brake cylinder 1, through port 24 in slide valve 7 and passage 25.

The emergency piston 10 is also moved to service position, upon a service reduction in brake pipe pressure, and in this position, port 19 registers with port 26 in slide valve 14. Port 26 registers with an exhaust port 27, since slide valve 14 remains in release position, and fluid under pressure is then vented from valve chamber 11 and the quick action chamber 13.

When the pressure in valve chamber 11 has been reduced to a degree slightly below the pressure in the brake pipe, the piston 10 will be shifted to its normal release position. In service position of slide valve 15, passage 21 is connected through port 20 and cavity 29 in the auxiliary valve 15 with a branch port 30, leading to port 26, so that any leakage of fluid from the emergency reservoir 18, past the check valve 22, will be vented to the atmosphere.

When the brake pipe pressure is reduced at an emergency rate, the triple valve piston 4 is shifted to emergency position, in which passage 31 is uncovered by the movement of slide valve 7, so that fluid under pressure is supplied from the auxiliary reservoir 6 to the brake cylinder.

The emergency piston 10 is also shifted to emergency position, and in the movement to this position, the auxiliary valve 15 is first shifted, so as to uncover the port 32, and passage 33, which registers with port 32 in the release position of the slide valve 14, remains in registry with port 32 in the movement of the slide valve 14 to emergency position, due to the foot extension of the passage 33. Fluid under pressure is then supplied from valve chamber 11 and the quick action chamber 13 through port 32 and passage 33 to pipe 34, which is connected to a quick action valve device, (not shown), which valve device is operated by fluid under pressure to effect a local reduction in brake pipe pressure in the usual manner.

In emergency position, a cavity 44 in slide valve 14 connects passage 38 with passage 36. Normally, the valve piston 45 of the cut-off pilot valve device E, is maintained in its seated position, as shown in the drawing, by spring 46 and consequently the valve 40 is held unseated, so that passage 36 is connected to passage 47.

In the emergency position, the spring side of valve piston 48 of the inshot valve device D is connected to the atmosphere through passage 49, cavity 35 in slide valve 14, and exhaust port 27, so that the valve piston 48 is moved upwardly by emergency reservoir pressure acting on the lower area of the valve piston outside its seat, as supplied through passage 21. Fluid under pressure is therefore supplied from the emergency reervoir 18 past the unseated valve piston 48 to passage 47 and thence flows to the brake cylinder by way of passage 36, cavity 44, and passage 38.

In release and service positions of the emergency valve device C, the passage 50, leading to the spring side of valve piston 45 is connected through cavity 44 in slide valve 14 with passage 38, so that in these positions, the spring side of the valve piston 45 is subjected to brake cylinder pressure. The inner seated area of the valve piston 45 at its lower face is subject to the pressure of fluid supplied to the brake cylinder, as supplied through port 51, and if the brakes were in release when the emergency application of the brakes is effected, the spring side of the valve piston 45 will be at atmospheric pressure and said piston will be moved from its seat when the brake cylinder pressure acting on the inner seated area of the valve piston slightly exceeds the pressure of spring 46. As soon as the valve piston unseats, the full area is exposed to brake cylinder pressure, so that the valve piston quickly moves upwardly so as to permit the valve 40 to be seated by the action of spring 52. Upon seating of the valve 40, further flow of fluid from the emergency reservoir to the brake cylinder is cut off.

If the emergency application is effected after a service application of the brakes, the fluid at brake cylinder pressure is trapped in the chamber at the spring side of the valve piston 45, so that the brake cylinder pressure must be built up by flow from the emergency reservoir to a correspondingly higher degree before the valve piston 45 will be shifted to permit the closure of valve 40. A substantially uniform initial inshot of fluid under pressure is thus effected in an emergency application, even though a service application of the brakes was previously made.

After the valve 40 closes, the brake cylinder pressure continues to be built up by the more gradual flow of fluid under pressure from the auxiliary reservoir to the brake cylinder as effected through the triple valve device A, and when the brake cylinder pressure acting on the inner seated area of the vavle piston 54 of the final inshot valve device F, has been increased to a predetermined degree, the valve piston 54 will be moved away from its seat. The outer seated area of the valve piston 54 is subject at all times to fluid at emergency reservoir pressure as supplied through passage 23 and the opposite side of the valve piston is subject to the pressure of spring 55. In emergency position, the spring side of the valve piston 54 is connected to valve chamber 11 and the quick action chamber 13, through passage 56 and port 57, so that movement of the valve piston 54 depends upon the reduction in quick action chamber pressure, as well as the building up of brake cylinder pressure.

Upon movement of the valve piston 54 from its seat, fluid under pressure is supplied from the emergency reservoir 18 to the brake cylinder to permit the final equalization of the emergency reservoir into the brake cylinder.

The brake cylinder is connected to the valve devices D, E, and F only upon movement of the emergency valve device to emergency position, so that possibility of leakage from the brake cylinder at these valve devices will be avoided. The valve pistons 48, 45 and 54 have poppet type rubber valve seats, which are liable to leakage, and consequently, it is desirable that brake cylinder pressure should not be admitted to said valve devices in service application of the brakes, in order to avoid possible leakage.

The cover plate 60 for the emergency valve device C is made separate from the cover plate 61 for the valve devices D and E, so as to ensure against leakage, such as might occur with a single large area cover plate, due to distortion.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake cylinder, of means operated in an emergency application of the brakes for suplying fluid under pressure to the brake cylinder and a valve device operated upon an increase in brake cylinder pressure for cutting off communication through which said means supplies fluid to the brake cylinder, the closing movement of said valve device being opposed by brake cylinder pressure.

2. In a fluid pressure brake, the combination with a brake cylinder, of means operated in an emergency application of the brakes for supplying fluid under pressure to the brake cylinder and a valve device operated upon an increase in brake cylinder pressure for cutting off communication through which said means supplies fluid to the brake cylinder, the closing movement of said valve device being opposed by brake cylinder pressure previously supplied to said valve device.

3. In a fluid pressure brake, the combination with a brake cylinder, of means operated upon effecting an emergency application of the brakes for supplying fluid under pressure to the brake cylinder, a spring, and a valve device subject to the opposing pressures of the brake cylinder and said spring and operated upon a predetermined increase in brake cylinder pressure for cutting off communication through which said means supplies fluid to the brake cylinder, the closing movement of said valve device being opposed by brake cylinder pressure previously supplied to said valve device.

4. In a fluid pressure brake, the combination with a brake cylinder, of an emergency valve device, means operated by said valve device in effecting an emergency application of the brakes for supplying fluid under pressure to the brake cylinder, a cut-off valve device operated upon a predetermined increase in brake cylinder pressure for cutting off communication through which said means supplies fluid to the brake cylinder, said emergency valve device being adapted to supply fluid at brake cylinder pressure to said cut-off valve device upon a service application of the brakes to oppose the closing movement of said cut-off valve device.

5. In a fluid pressure brake, the combination with a brake cylinder, of an emergency valve device, means operated by said valve device in effecting an emergency application of the brakes for supplying fluid under pressure to the brake cylinder, a cut-off valve device operated upon a predetermined increase in brake cylinder pressure for cutting off communication through which said means supplies fluid to the brake cylinder, said emergency valve device normally establishing a communication through which fluid at brake cylinder pressure is supplied in a service application of the brakes to said cut-off valve device to oppose the closing movement of said cut-off valve device.

6. In a fluid pressure brake, the combination with a brake cylinder and brake pipe, of means operated upon a gradual reduction in brake pipe pressure for supplying fluid under pressure to the brake cylinder, means operated upon a sudden reduction in brake pipe pressure for supplying fluid under pressure to the brake cylinder, a cut-off valve device operated upon a predetermined increase in brake cylinder pressure for cutting off communication through which said second named means supplies fluid to the brake cylinder, and means for subjecting said valve device to the pressure of fluid supplied to the brake cylinder by said first named means.

7. In a fluid pressure brake, the combination with a brake cylinder, of valve means operative in effecting an emergency application of the brakes for controlling the supply of fluid under pressure to the brake cylinder, and means for cutting off communication from the brake cylinder to said valve means except when an emergency application of the brakes is effected.

8. In a fluid pressure brake, the combination with a brake cylinder, of an initial inshot cut-off valve device operative upon effecting an emergency application of the brakes for supplying fluid under pressure to the brake cylinder, and means for connecting the brake cylinder to said valve device only in effecting an emergency application of the brakes.

9. In a fluid pressure brake, the combination with a brake cylinder, of an initial inshot valve device operative upon effecting an emergency application of the brakes for supplying fluid under pressure to the brake cylinder, a cut-off valve device operative upon a predetermined increase in brake cylinder pressure for cutting off communication through which said inshot valve device supplies fluid to the brake cylinder, and means for cutting off communication from the brake cylinder to said valve devices except when an emergency application of the brakes is effected.

10. In a fluid pressure brake, the combination with a brake cylinder, of an initial inshot valve device operative upon effecting an emergency application of the brakes for supplying fluid under pressure to the brake cylinder, a cut-off valve device operative upon a predetermined increase in brake cylinder pressure for cutting off communication through which said inshot valve device supplies fluid to the brake cylinder, a final inshot valve device for also supplying fluid under pressure to the brake cylinder in effecting an emergency application of the brakes, and means for cutting off communication from the brake cylinder to said valve devices at all times except when an emergency application of the brakes is effected.

THOMAS H. THOMAS.